United States Patent
Qiu et al.

(10) Patent No.: US 10,219,242 B2
(45) Date of Patent: Feb. 26, 2019

(54) SYSTEM AND METHOD FOR DELIVERING NOTIFICATIONS

(71) Applicant: Futurewei Technologies, Inc., Plano, TX (US)

(72) Inventors: Binqiang Qiu, San Diego, CA (US); Zenghua Fang, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/600,661

(22) Filed: Jan. 20, 2015

(65) Prior Publication Data
US 2016/0212725 A1 Jul. 21, 2016

(51) Int. Cl.
| H04W 4/80 | (2018.01) |
| H04W 76/14 | (2018.01) |
| H04W 68/00 | (2009.01) |
| H04M 1/725 | (2006.01) |
| H04W 88/04 | (2009.01) |

(52) U.S. Cl.
CPC ..... H04W 68/005 (2013.01); H04M 1/72527 (2013.01); H04W 4/80 (2018.02); H04W 76/14 (2018.02); H04W 88/04 (2013.01)

(58) Field of Classification Search
CPC ............. G06F 19/3418; G06F 19/3406; G06F 19/322; G06F 19/3431; G06F 19/345; G06F 21/445; A61B 5/0006; A61B 5/0022; A61B 5/7275; A61B 5/002; A61B 5/024; A61B 5/0004; A61B 5/14532; A61B 2560/0431
USPC ......................................................... 455/458
See application file for complete search history.

(56) References Cited

U.S. PATENT DOCUMENTS

| 2003/0105820 A1* | 6/2003 | Haims ................... G06Q 10/10 709/205 |
| 2005/0272408 A1* | 12/2005 | Wilkes-Gibbs ....... H04M 19/04 455/412.2 |
| 2006/0194589 A1* | 8/2006 | Sankisa ................. H04W 76/14 455/456.1 |
| 2010/0274848 A1* | 10/2010 | Altmaier ............... H04L 67/104 709/203 |
| 2013/0103847 A1* | 4/2013 | Brown .................. H04L 63/083 709/229 |
| 2013/0268687 A1* | 10/2013 | Schrecker ............. H04W 12/06 709/229 |
| 2014/0273975 A1* | 9/2014 | Barat ................. G06F 15/17312 455/412.2 |
| 2015/0031348 A1* | 1/2015 | Lee ........................ H04B 1/385 455/418 |

(Continued)

OTHER PUBLICATIONS

"Adding Pages to a Notification," Android Developers, https://developer.android.com/training/wearables/notification/pages.html, downloaded Jan. 10, 2015, 2 pages.

(Continued)

*Primary Examiner* — Kwasi Karikari
(74) *Attorney, Agent, or Firm* — Slater Matsil, LLP

(57) ABSTRACT

A method for operating a first user equipment (UE) includes establishing an application layer connection with a second UE, wherein the first UE and the second UE are indirectly coupled to each other by a communications network, detecting an occurrence of an event at the first UE, and sending a first notification of the event to the second UE over the application layer connection.

26 Claims, 11 Drawing Sheets

(56) References Cited

U.S. PATENT DOCUMENTS

| | | | | |
|---|---|---|---|---|
| 2015/0065095 A1* | 3/2015 | Seo | ............ | H04L 67/2823 |
| | | | | 455/412.2 |
| 2015/0262458 A1* | 9/2015 | Faaborg | .......... | G08B 5/228 |
| | | | | 340/539.11 |
| 2015/0296480 A1* | 10/2015 | Kinsey | .......... | H04W 4/008 |
| | | | | 455/41.3 |

OTHER PUBLICATIONS

"Adding Wearable Features to Notification," Android Developers, https://developer.android.com/traning/earables/notifications/index.html, downloaded Jan. 10 , 2015, 2 pages.

"Using the Backup API," Android Developers, http://developer.android.com/training/cloudsync/backupapi.html, Jdownloaded Jan. 10, 2015, 4 pages.

"Creating a Notification for Wearables," Android Developers, https://developer.android.com/training/wearables/notifications/creating.html, downloaded Jan. 10, 2015, 6 pages.

"Google Cloud Messaging," Wikipedia, the free encyclopedia, http://en.wikipeida.org/wiki/Google_Cloud_Messaging, downloaded Jan. 10, 2015, 2 pages.

"Making the Most of Google Cloud Messaging," Android Developers, http://developer.android.com/traning/cloudsync/gcm.html, downloaded Jan. 10, 2015, 4 pages.

"Receiving Voice Input in a Notification," Android Developers, https://developer.android.com/training/wearables./notifications/voice-input.html., downloaded Jan. 10, 2015, 3 pages.

"Stacking Notifications," Android Developers, https://developer.android.com/training/wearables/notifications/stacks.html, downloaded Jan. 10, 2015, 3 pages.

"Syncing to the Cloud," Android Developers, http://developer.android.com/training/cloudsync/index.html., downloaded Jan. 10, 2015, 2 pages.

* cited by examiner

SYSTEM AND METHOD FOR DELIVERING NOTIFICATIONS

TECHNICAL FIELD

The present disclosure relates generally to digital communications, and more particularly to a system and method for delivering notifications.

BACKGROUND

Wearable devices, such as smart watches, smart bands, smart eyewear, and the like, enable convenient ways for users to interact with information. The users can access information without having to continually search for and access their smart telephones, which may be difficult, such as when the smart telephone is in a pocket and the user is sitting down or driving. However, to reduce size and cost, as well as to increase battery life, the wearable devices generally have limited connectivity to services. Therefore, there is a need for systems and methods for delivering notifications to wearable devices.

SUMMARY OF THE DISCLOSURE

Example embodiments of the present disclosure which provide a system and method for delivering notifications.

In accordance with an example embodiment of the present disclosure, a method for exchanging notifications is provided. The method includes establishing, by a first user equipment (UE), an application layer connection with a second UE, wherein the first UE and the second UE are indirectly coupled to each other by a communications network, and detecting, by the first UE, an occurrence of an event at the first UE. The method also includes sending, by the first UE, a first notification of the event to the second UE over the application layer connection.

In accordance with another example embodiment of the present disclosure, a method for exchanging notifications is provided. The method includes establishing, by a second user equipment (UE), an application layer connection with a first UE, wherein the second UE and the first UE are indirectly coupled to each other by a communications network, and receiving, by the second UE, a first notification of an event occurring at the first UE over the application layer connection. The method also includes operating, by the second UE, in a manner responsive to the first notification.

In accordance with another example embodiment of the present disclosure, a first user equipment (UE) is provided. The first UE includes a processor, and a transmitter operatively coupled to the processor. The processor establishes an application layer connection with a second UE, wherein the first UE and the second UE are indirectly coupled to each other by a communications network, and detects an occurrence of an event on the first UE. The transmitter sends a notification of the event to the second UE over the application layer connection One advantage of an embodiment is that smart telephones do not have to be kept near wearable devices, enabling users to carry only wearable devices. This is especially advantageous in situations when the users have limited capacity for carrying devices, such as when exercising.

A further advantage of an embodiment is that when a user is carrying multiple wearable devices, the user's smart telephone can determine which wearable device to send a notification to based on the capabilities of the wearable devices.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to delivering notifications. For example, a phone establishes an application layer connection with a wearable device, wherein the phone and the wearable device are indirectly coupled to each other by a communications network, detects an occurrence of an event at the phone, and sends a notification of the event to the wearable device over the application layer connection.

The present disclosure will be described with respect to example embodiments in a specific context, namely communications systems that support the establishment of application level sessions to deliver notifications between devices. The disclosure may be applied to standards compliant communications systems, such as those that are compliant with Third Generation Partnership Project (3GPP), IEEE 802.11, and the like, technical standards, and non-standards compliant communications systems, that support the establishment of application level sessions to deliver notifications between devices.

Figure 1:
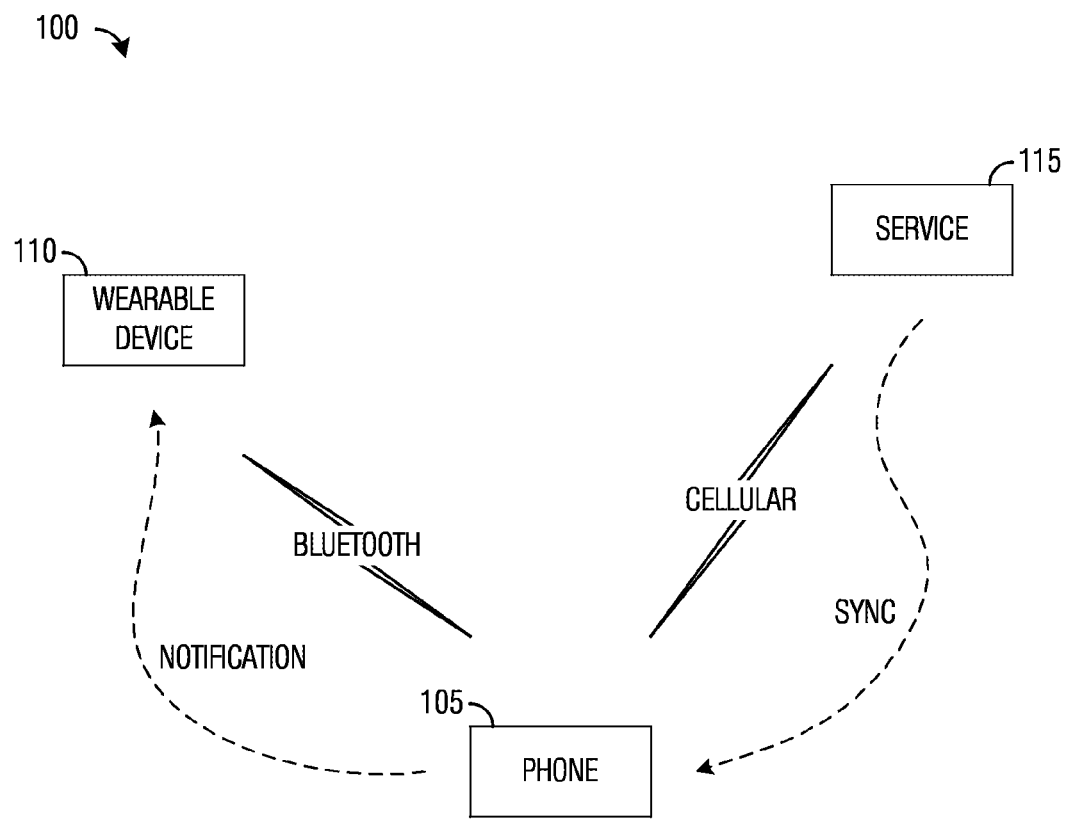
FIG. 1 illustrates an example communications system according to example embodiments described herein.

FIG. 1 illustrates an example communications system 100. Communications system 100 includes a phone 105 owned by a user. Phone 105 may be characterized as a smart phone with Internet connectivity via a cellular connection, as well as several other ways for connecting to other devices, including Wifi, Bluetooth, and the like. Communications system 100 also includes a wearable device 110 also owned by the user. Wearable device 110 may be a smart watch, a smart band, smart eyewear, and the like. Wearable device 110 may be limited in terms of processing power, display capability, and the like, when compared to phone 105. As such, wearable device 110 may not offer all of the connectivity of phone 105. As an illustrative example, wearable device 110 may offer Wifi and Bluetooth connectivity but not cellular connectivity. Phone 105 may be connected to a service 115 by way of a cellular connection. Service 115 may be an email service, a texting service, a music service, a video service, and the like, delivering information to phone 105. Without loss of generality, phones and wearable devices may be referred to as user equipment (UE). While it is understood that communications systems may employ multiple phones capable of communicating with a number of wearable devices and services, only one phone, one wearable device, and one service are illustrated for simplicity.

A common way that the user may utilize phone 105 and wearable device 110 is to have notifications (e.g., emails, texts, and the like), music, video, and so on, displayed on wearable device 110 rather than phone 105. This may be achieved by using a Bluetooth connection between phone 105 and wearable device 110 and having phone 105 forward notifications, music, videos, and the like, to wearable device 110. However, since Bluetooth has limited range, phone 105 and wearable device 110 typically need to be close together.

When phone 105 and wearable device 110 are not close together, a Bluetooth connection cannot be established between the two devices and phone 105 is generally unable to send notifications to wearable device 110. Therefore, the usefulness of wearable device 110 may be limited. Examples of situations when phone and wearable device may not be close together include: the user forgetting to carry the phone but since the user is wearing the wearable device, the wearable device is with the user; the user is exercising and carrying the phone is difficult, but the wearable device is easy to carry; and the like.

According to an example embodiment, an application layer connection is established between a phone and the wearable device. The application layer connection may allow applications executing on the phone to send and/or receive information to and/or from the wearable device, even when the phone and the wearable device are not in close proximity, thereby preventing the establishment of a direct connection (e.g., Bluetooth or Bluetooth Low Energy (BLE)) between the two devices. The application layer connection is established over a secure session, thereby protecting privacy of the user. The application layer connection includes a first connection between the phone and the cloud (which may often be commonly referred to as the Internet, a network, and the like) and a second connection between the cloud and the wearable device. The first connection (between the phone and the cloud) may be over a cellular connection, a Wifi connection, a Bluetooth connection, or any other type of connection supported by the phone that allows a data exchange between the phone and services in the cloud. The second connection (between the cloud and the wearable device) may be over a Wifi connection, a Bluetooth connection, or other type of connection supported by the wearable device that allows a data exchange between the wearable device and the cloud.

According to an example embodiment, a remote server is used as an intermediary, helping to establish the application layer connection between a phone and a wearable device. In general, when the phone connects to the cloud, it registers with the remote server. The remote server may store identity information about the phone (including the phone's Internet Protocol (IP) address, Media Access Control (MAC) address, and the like). The remote server may also store identity information about a wearable device(s) associated with the phone. The identity information of the phone and the wearable device(s) may be stored in a database. The identity information may be used to match up (i.e., link, associate, and the like) the two devices when both are present in the cloud. When both devices are present in the cloud, the remote server may initiate the establishment of the application layer connection over a secure session. The remote server may also serve as intermediary in tearing down the application layer connection when one or both devices are no longer present in the cloud.

Figure 2:
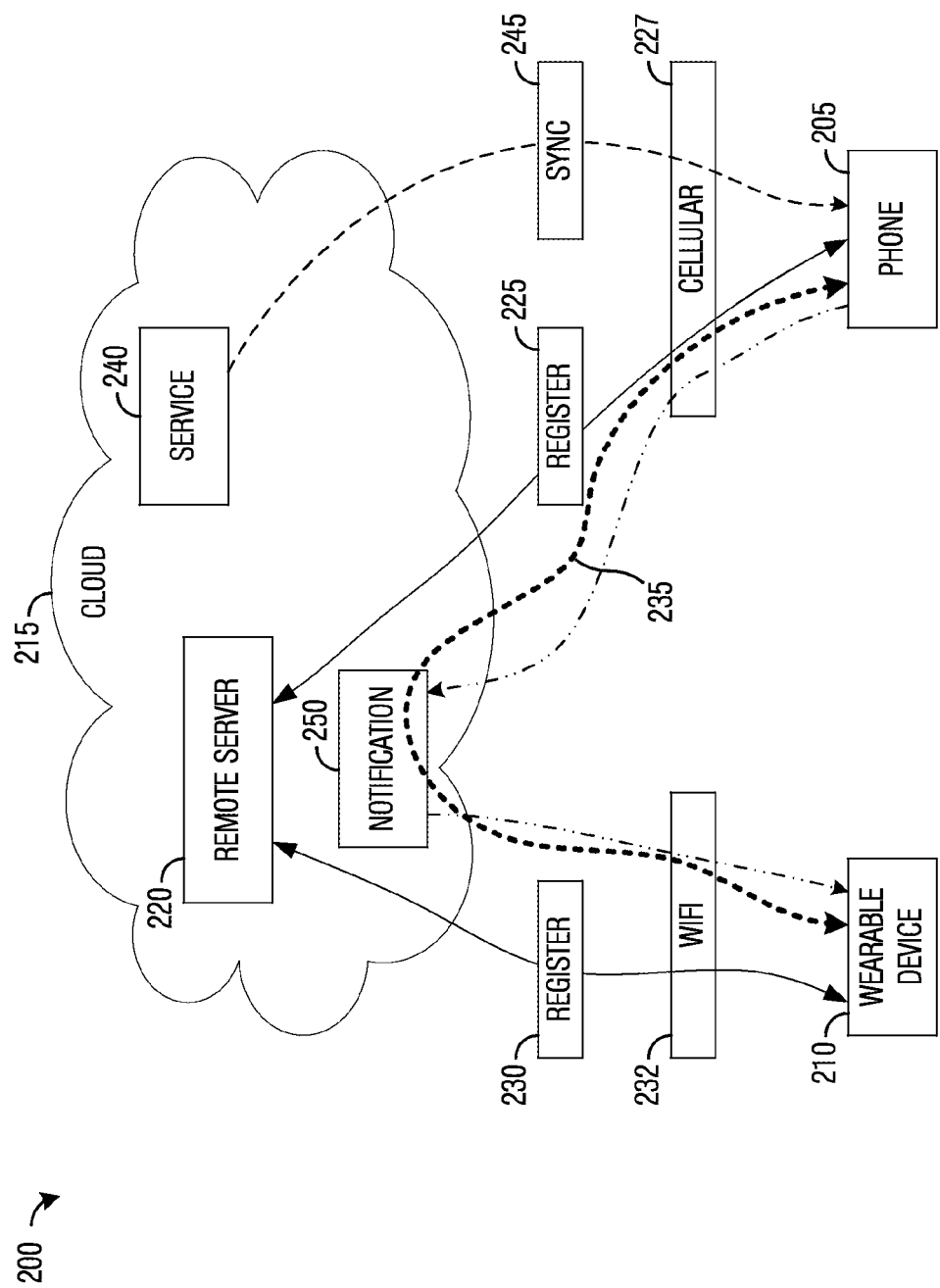
FIG. 2 illustrates an example communications system highlighting an applications layer connection according to example embodiments described herein.

FIG. 2 illustrates an example communications system 200 highlighting an applications layer connection. Communications system 200 includes a phone 205 and a wearable device 210. Both phone 205 and wearable device 210 are connected to cloud 215. However, phone 205 and wearable device 210 are remotely located with respect to one another so there is no direct connection (e.g., via Bluetooth, BLE, Wifi, and the like) between the two devices.

When phone 205 and wearable device 210 attach to cloud 215, they register with a remote server 220. As shown in FIG. 2, phone 205 registers (register box 225) with remote server 220 through its cellular connection 227, while wearable device registers (register box 230) with remote server 220 through its Wifi connection 232. Although cellular and Wifi connections are shown in FIG. 2, other types of connections are possible. As part of the registration process, remote server 220 may save identifying information for phone 205 and wearable device 210, as well as association information for the two devices, therefore linking the two devices together.

Remote server 220 may initiate the establishment of a secure session 235 between phone (i.e., a smart phone) 205 and wearable device 210, as well as an application layer connection between the two devices. After the registration of the two devices, the establishment of secure session 235 and the application layer connection may occur. After the registration of the two devices, the establishment of secure session 235 and the application layer connection may occur whenever a second of the two devices attaches to cloud 215. As an example, if phone 205 is already attached to cloud 215 and wearable device 210 subsequently attaches to cloud 215, remote server 220 may initiate the establishment of secure session 235 and the application layer connection. Similarly, if wearable device 210 is already attached to cloud 215 and phone 205 subsequently attaches to cloud 215, remote server 220 may initiate the establishment of secure session 235 and the application layer connection.

A service 240, such as an email service, a music streaming service, a video streaming service, a voice call service, a conferencing service, a messaging service, a telephone service, a calendar service, a social media service, and the like, that is a part of cloud 215 may synchronize (sync box 245) with phone 205 over cellular connection 227. Phone 205 may send a notification 250 to wearable device 210 through secure session 235 and the application layer connection. Alternatively, an event may occur in phone 205, such as a calendar event, a timer event, an alarm event, and the like, that triggers a notification to wearable device 210. Similarly, wearable device 210 may send a notification to phone 205 when it has information to send to phone 205. As an illustrative example, a temperature sensor or a motion sensor on wearable device 210 may send updated information to phone 205, to monitor body temperature, location information, and the like.

Figure 3:
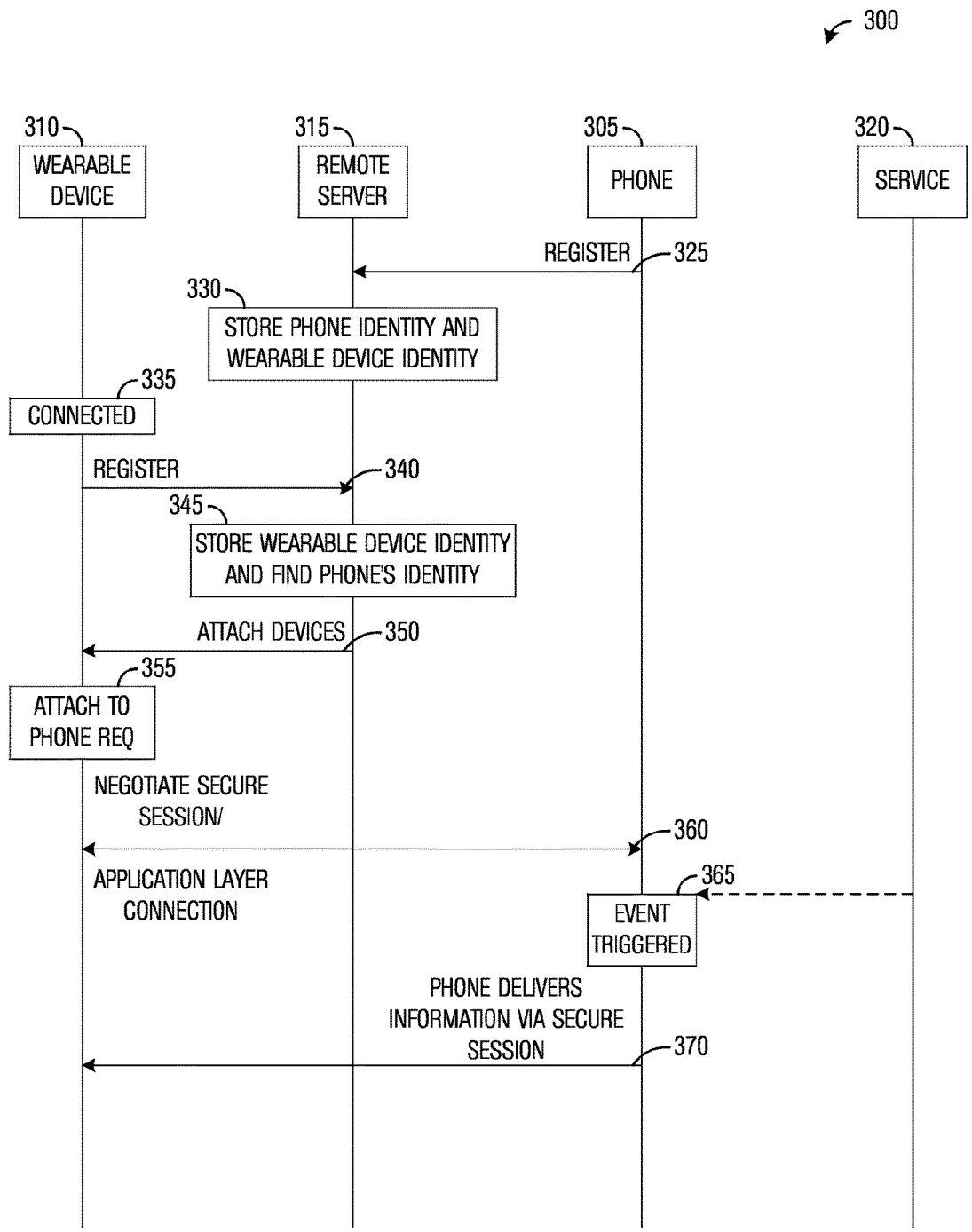
FIG. 3 illustrates a diagram of example devices and example operations occurring at the devices in the establishment of a secure session and transmission of a notification over the secure session according to example embodiments described herein.

FIG. 3 illustrates a diagram 300 of example devices and example operations occurring at the devices in the establishment of a secure session and transmission of a notification over the secure session. Diagram 300 includes operations occurring at a phone 305, a wearable device 310, a remote server 315, and a service 320.

Phone 305 may register with remote server 315 (shown as event 325). Remote server 315 may save identity information of phone 305, as well as identity information for a wearable device(s) associated with phone 305, which may include wearable device 320 (block 330). The saving of the identity information for phone 305 and wearable device 310 may link phone 305 to wearable device 310 and vice versa. Wearable device 305 may connect to remote server 315 (block 335). As an illustrative example, wearable device 310 may connect to remote server 315 when it establishes a connection to the cloud through a Wifi connection, a Bluetooth connection, and the like. It is noted that wearable device 310 and phone 305 may be too far apart to establish a direct connection with each other.

Part of wearable device 310 becoming connected to the cloud may include wearable device 310 registering with remote server 315 (shown as event 340). Remote server 315 may access identity information of wearable device 310 and store it. Remote server 315 may recognize that wearable device 310 is associated with phone 305 through identity information of wearable device 310 and identity information of phone 305 linked to wearable device 310 (block 345). Remote server 315 may initiate attachment of phone 305 to wearable device 310 through a secure session and application layer connection (shown as event 350).

Wearable device 310 may initiate establishment of the secure session by sending an attach to phone request (block 355). Phone 305 and wearable device 310 may negotiate the secure session and establish the application layer connection by exchanging messages (shown as event 360). With the application layer connection established, phone 305 and wearable device 310 may communicate by exchanging messages, as if they were directly connected over a short range Bluetooth connection. An event may be triggered in phone 305 (block 365) or phone 305 may receive information from service 320 and phone 305 may send a notification to wearable device 310 over the application layer connection.

Figure 4:
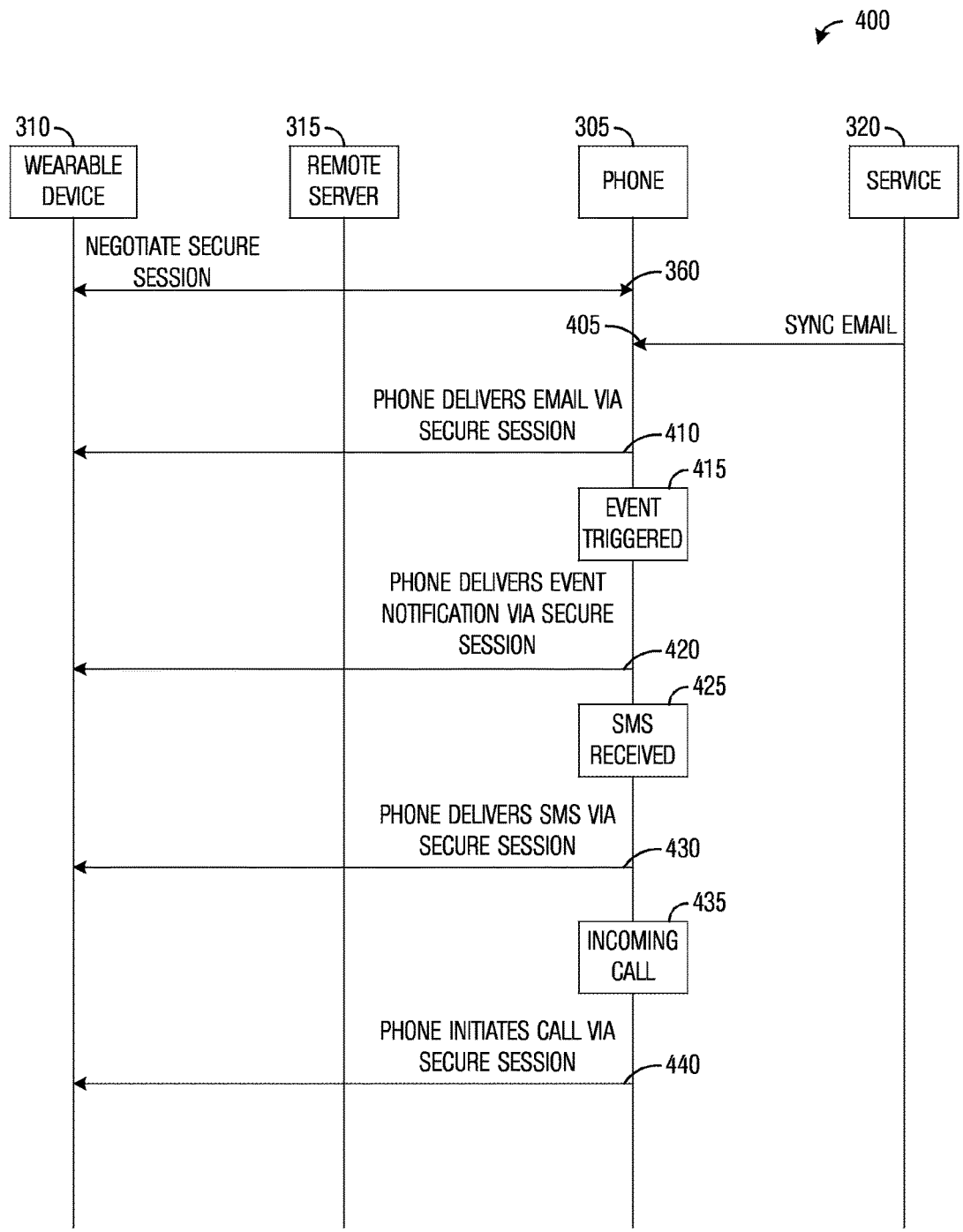
FIG. 4 illustrates a diagram of example devices and example operations occurring at the devices in the transmission of a notification over a secure session according to example embodiments described herein.

FIG. 4 illustrates a diagram 400 of example devices and example operations occurring at the devices in the transmission of a notification over a secure session. Diagram 400 includes operations occurring at a phone 305, a wearable device 310, a remote server 315, and a service 320.

Phone 305 and wearable device 310 may negotiate a secure session and establish an application layer connection by exchanging messages (shown as event 360). With the application layer connection established, phone 305 and wearable device 310 may exchange information, even when they are not operating in close proximity, over the application layer connection. As an illustrative example, service 320 and phone 305 may synchronize emails (shown as event 405). As a result of the synchronization of emails, there may be one or more emails that have been updated on phone 305. Phone 305 may provide the emails (or at least headers or a summary thereof) to wearable device 310 over the secure session using the application layer connection (shown as event 410). As another illustrative example, an event may occur at phone 305, such as a calendar event, a timer elapsing, an alarm clock triggering, and the like (block 415). Phone 305 may deliver notification of the event to wearable device 310 over the secure session using the application layer connection (shown as event 420). As yet another illustrative example, phone 305 may receive a message, such as a short message service (SMS) message, multimedia messaging service (MMS) message, extended message service (EMS) message, smart messaging message, and the like, and the message has not been delivered to wearable device 310 (shown as event 425). Phone 305 may deliver notification of the message to wearable device 310 over the secure session using the application layer connection (shown as event 430). As a further illustrative example, phone 305 may receive an incoming call (block 435). Phone 305 may deliver notification of the incoming call to wearable device 310 over the secure session using the application layer connection (shown as event 440).

Although the discussion of FIGS. 3 and 4, as well as those presented herein, focus on the phone sending notifications to wearable devices, the example embodiments disclosed are also applicable to situations where a wearable device sends notifications to a phone over a secured session and an application layer connection. Therefore, the discussion of notifications from phones being sent to wearable devices should not be construed as being limiting to either the scope or the spirit of the example embodiments.

Figure 5:
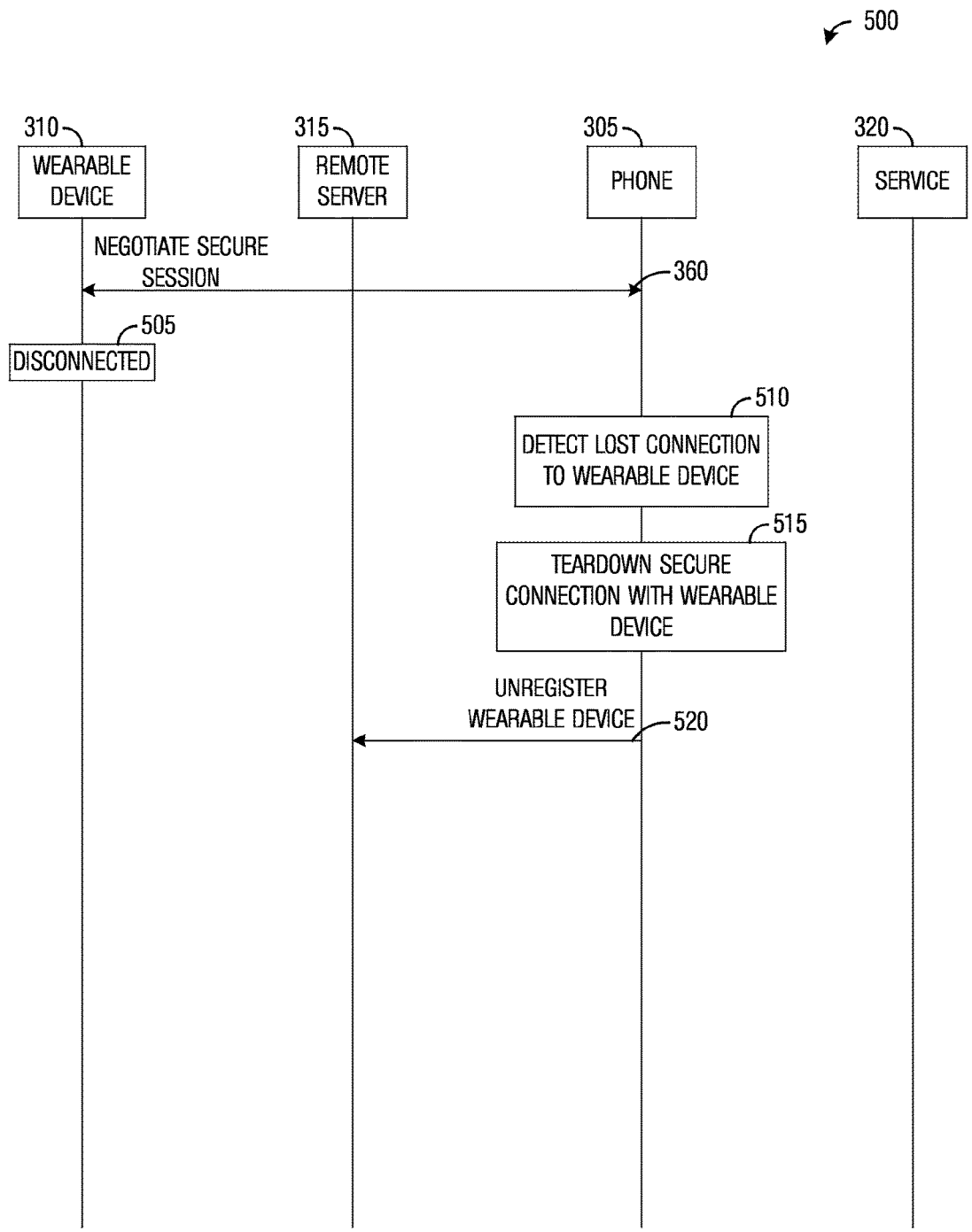
FIG. 5 illustrates a diagram of example devices and example operations occurring at the devices as a wearable device disconnects according to example embodiments described herein.

FIG. 5 illustrates a diagram 500 of example devices and example operations occurring at the devices as a wearable device disconnects. Diagram 500 includes operations occurring at a phone 305, a wearable device 310, a remote server 315, and a service 320.

Phone 305 and wearable device 310 may negotiate a secure session and establish an application layer connection by exchanging messages (shown as event 360). With the application layer connection established, phone 305 and wearable device 310 may exchange information, even when they are not operating in close proximity, over the application layer connection.

Wearable device 310 may, at some time, disconnect from the cloud (block 505). Wearable device 310 may disconnect for a variety of reasons, including: wearable device 310 may move out of range of its connection to the cloud; wearable device 310 may run out of power; wearable device 310 may be powered down by its user; the user of wearable device 310 may purposefully disconnect wearable device 310 from the cloud; and the like. Phone 305 may detect that it has lost connection to wearable device (block 510). As an illustrative example, a transmission by phone 305 to wearable device 310 may time out, a keep-a-live transmission to maintain the application layer connection may fail (e.g., time out, not be acknowledged, and the like), a transmission from wearable device 310 may fail, and so on. Phone 305 may tear down the secure connection with wearable device 310 (block 515). Phone 305 may unregister wearable device 310 (block 520). As an illustrative example, phone 305 may transmit a message to remote server 315 to unregister wearable device 320. It is noted that the association between phone 305 and wearable device 310 may be maintained by remote server 315 so that at a later time when wearable device 310 connects to the cloud once again, a new secure session and application layer connection may be established.

According to an example embodiment, context-aware delivery of notifications is supported. In a situation when a user has multiple wearable devices associated with a phone and when multiple wearable devices are actively connected to the cloud, it is possible to direct notifications that have been configured to accept notifications based on notification type and/or to direct notifications that are better suited to the notification type. The phone associated with the multiple wearable devices may determine where to direct the notifications.

Figure 6:
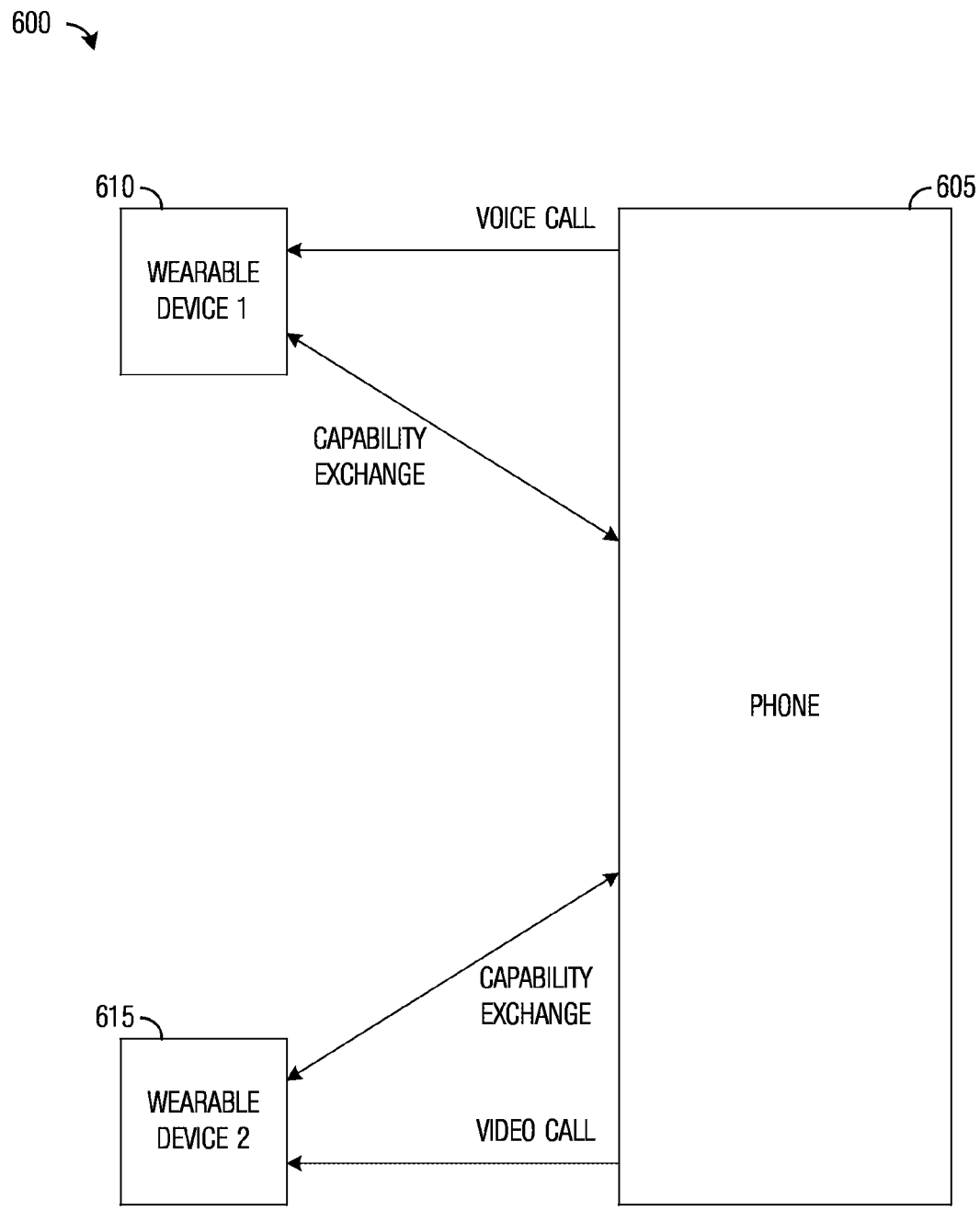
FIG. 6 illustrates a portion of an example communications system highlighting context-aware delivery of notifications according to example embodiments described herein.

FIG. 6 illustrates a portion of an example communications system 600 highlighting context-aware delivery of notifications. Communications system 600 includes a phone 605 that is connected with a first wearable device 610 and a second wearable device 615. Phone 605 may be connected to first wearable device 610 and second wearable device 615 through secure sessions and application layer connections as described herein. Alternatively, phone 605 may be connected to one of the wearable devices (e.g., first wearable device 610) through a secure connection and an application layer connection as described herein and another of the wearable devices (e.g., second wearable device 615) through a direct short range connection (e.g., Bluetooth, BLE, Wifi, and the like). As yet another alternative, phone 605 be connected to first wearable device 610 and second wearable device 615 through direct short range connections.

When phone 605 is initially attached to first wearable device 610 and second wearable device 615, phone 605 may be able to determine the capabilities of first wearable device 610 and second wearable device 615. As an illustrative example, phone 605 may use a discovery and/or probing process to determine the capabilities of the wearable devices. The discovery and/or probing process is shown in FIG. 6 as a capability exchange. As another illustrative example, the user of the wearable devices may enter information about the capabilities of the wearable devices into phone 605. As yet another illustrative example, phone 605 may automatically go through the capability exchange with the wearable devices, but the user may also be able to manually enter preferences that can override information determined by phone 605 in the capability exchange process.

When a service, such as an email service, a music streaming service, a video streaming service, a messaging service, a telephone service, a calendar service, and the like, that is a part of the cloud may synchronize with phone 605, phone 205 may analyze the notification and select which of the wearable devices based on the notification (e.g., notification type) and information determined during the capability exchange and potentially any user entered information, and send a notification to the selected wearable device through the secure session and the application layer connection with the selected wearable device. Alternatively, an event may occur in phone 605, such as a calendar event, a timer event, an alarm event, and the like, that triggers a notification to a wearable device. In such a situation, phone 605 may also analyze the notification and select which of the wearable devices based on the notification (e.g., notification type) and information determined during the capability exchange and potentially any user entered information, and send a notification to the selected wearable device through the secure session and the application layer connection with the selected wearable device.

Figure 7:
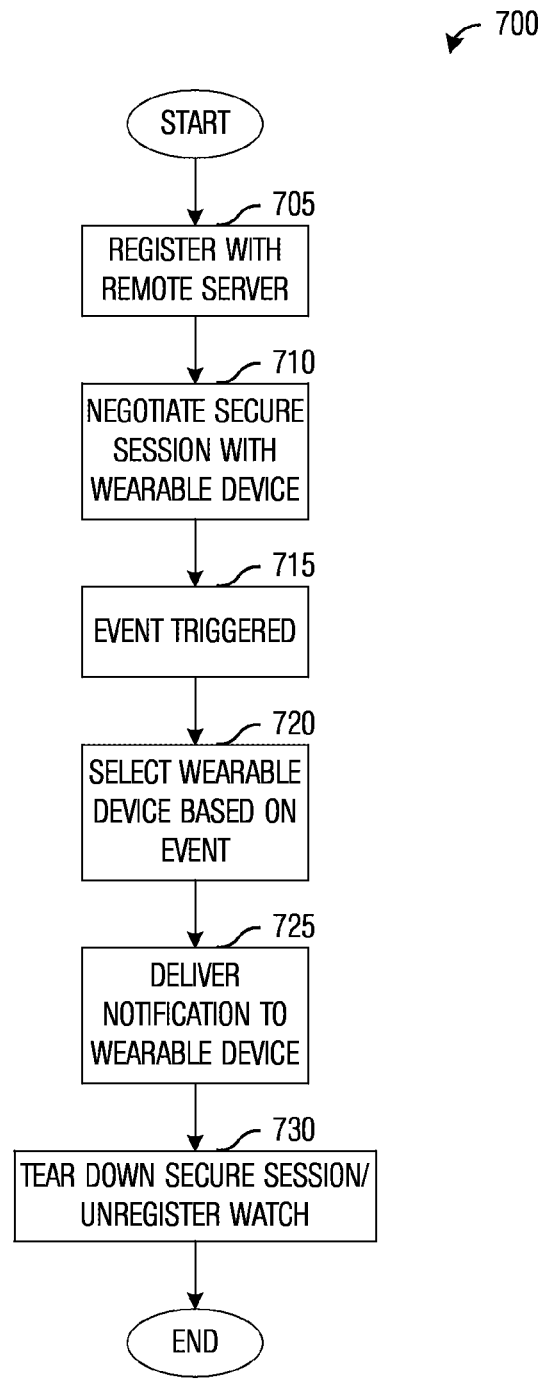
FIG. 7 illustrates a flow diagram of example operations occurring in a phone according to example embodiments described herein.

FIG. 7 illustrates a flow diagram of example operations 700 occurring in a phone. Operations 700 may be indicative of operations occurring in a phone, such as phone 305 and phone 605, as the phone delivers notifications to a wearable device over a secure session and an application layer connection.

Operations 700 may begin with the phone registering with a remote server (block 705). Registering with the remote server may involve the remote server obtaining and storing identifying information of the phone, as well as identifying information of a wearable device(s) associated with the phone, in a database. The remote server may associate the wearable device(s) with the phone.

The phone may be instructed to attach with a wearable device that it is associated with the phone. Part of the attachment process may include the phone and the wearable device negotiating a secure session (block 710). The negotiation may include the phone and the wearable device exchanging messages. The negotiation of the secure session may result in the establishment of the secure session as well as an application layer connection between the phone and the wearable device. The secure session includes a connection between the phone and the cloud over a first access network (such as cellular, Wifi, Bluetooth, BLE, and the like) and a connection between the cloud and the wearable device over a second access network (such as Wifi, Bluetooth, BLE, and the like). In general, the secure session does not include a direct connection between the phone and the wearable device, which may imply that the two devices are operating in close proximity.

An event may be triggered at the phone (block 715). The event may be information (such as email, and the like) synchronized between the phone and a service in the cloud. The event may be a scheduled or programmed event occurring in the phone, such as a calendar event, a timer event, an alarm event, and the like. The event may be an incoming occurrence, such as an incoming call, and the like. The phone may select a wearable device based on the event (block 720). If the phone is connected to a plurality of wearable device, the phone may select which one of the plurality of wearable devices to deliver the notification to. The selection of the wearable device may be based on event type, as well as information configured during a capability exchange involving the wearable devices and/or input by the user. The phone may deliver a notification of the event to the wearable device (e.g., the selected wearable device in a situation when the phone is connected to the plurality of wearable devices) (block 725). The discussion involving the sending of a notification by a phone to a wearable device may also be applicable to situations where a notification is sent by a wearable device to a phone.

The phone may detect that it has lost connection with the wearable device. In such a situation, the phone may tear down the secure connection with the wearable device and/or unregister the wearable device (block 730).

Figure 8:
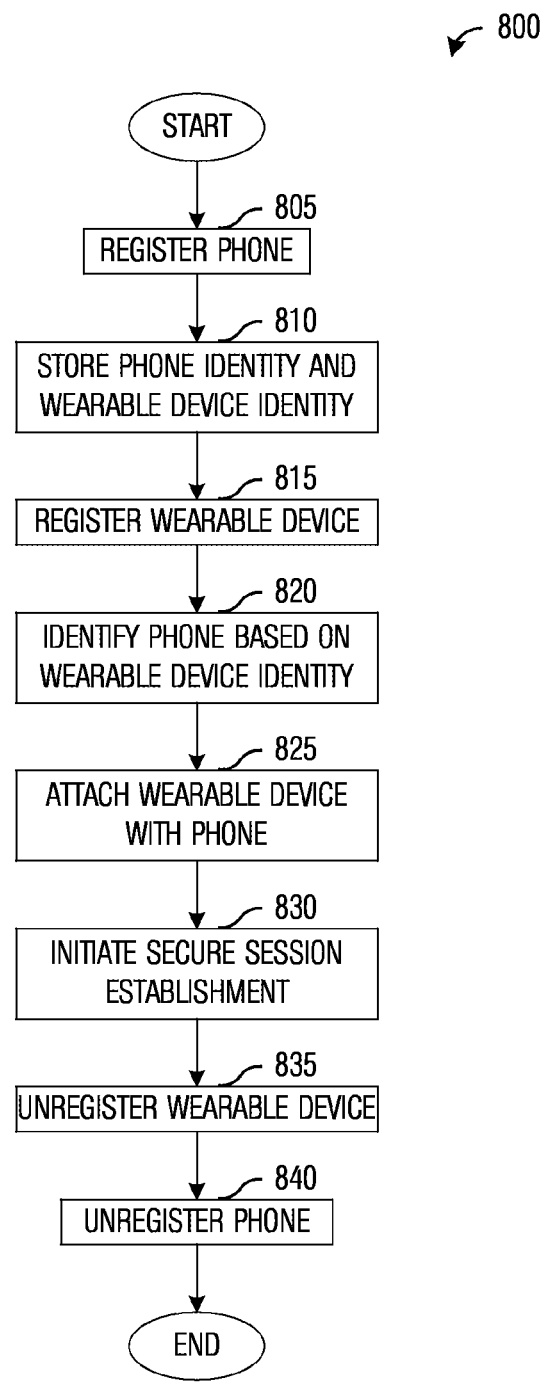
FIG. 8 illustrates a flow diagram of example operations occurring in a remote server according to example embodiments described herein.

FIG. 8 illustrates a flow diagram of example operations 800 occurring in a remote server. Operations 800 may be indicative of operations occurring in a remote server, such as remote server 315, as the remote server helps a phone deliver notifications to a wearable device over a secure session and an application layer connection.

Operations 800 may begin with the remote server registering a phone (block 805). The phone may be registered when it attaches to the cloud. The remote server may obtain and store identifying information of the phone, as well as identifying information of a wearable device(s) associated with the phone, in a database (block 810). The remote server may associate the wearable device(s) with the phone.

The remote server may register a wearable device (block 815). The wearable device may be registered when it attaches to the cloud. The remote server may obtain identifying information about the wearable device. Based on the identifying information obtained from the wearable device, the remote server may be able to identify the wearable device (block 820). The remote server may be able to identify that the wearable device is associated with a phone that is also registered with the remote server.

The remote server may attach the wearable device with the phone that is associated with the wearable device (block 825). The remote server may also initiate the negotiation of a secure session and an application layer connection between the phone and the wearable device (block 830).

The remote server may unregister the wearable device (block 835). If the wearable device detaches from the cloud, the phone to which it is connected may request that the remote server unregister the wearable device. The remote server may unregister the phone (block 840). The remote server may unregister the phone when the phone detaches from the cloud.

Figure 9:
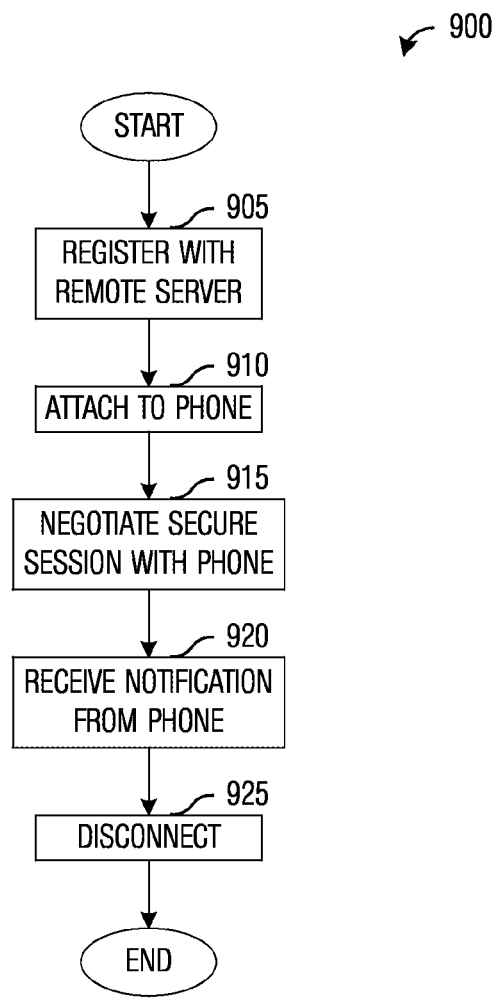
FIG. 9 illustrates a flow diagram of example operations occurring in a wearable device according to example embodiments described herein.

FIG. 9 illustrates a flow diagram of example operations 900 occurring in a wearable device. Operation 900 may be indicative of operations occurring at a wearable device, such as wearable device 310, wearable device 610, and wearable device 615, as the wearable device receives notifications from a phone over a secure session and an application layer connection.

Operations 900 may begin with the wearable device registering with a remote server (block 905). The wearable device may register with the remote server when it attaches to the cloud. The wearable device may be identified by the remote server as being associated with a phone and may be instructed to attach to the phone (block 910). The wearable device and the phone may negotiate a secure session and an application layer connection (block 915). The wearable device may receive a notification from the phone over the secure session and the application layer connection (block 920). The wearable device may operate in a manner responsive to the notification. As an illustrative example, if the notification is for an email, the wearable device may display at least a portion of the incoming email along with an audible tone and/or a vibration. As another illustrative example, if the notification is for an incoming call, the wearable device may display caller identification information and play a ringtone. As yet another illustrative example, if the notification is for an elapsed timer, the wearable device may play an audible tone and/or vibrate. As discussed previously, the wearable device may send a notification to the phone. The wearable device may disconnect from the cloud (block 925).

Figure 10:
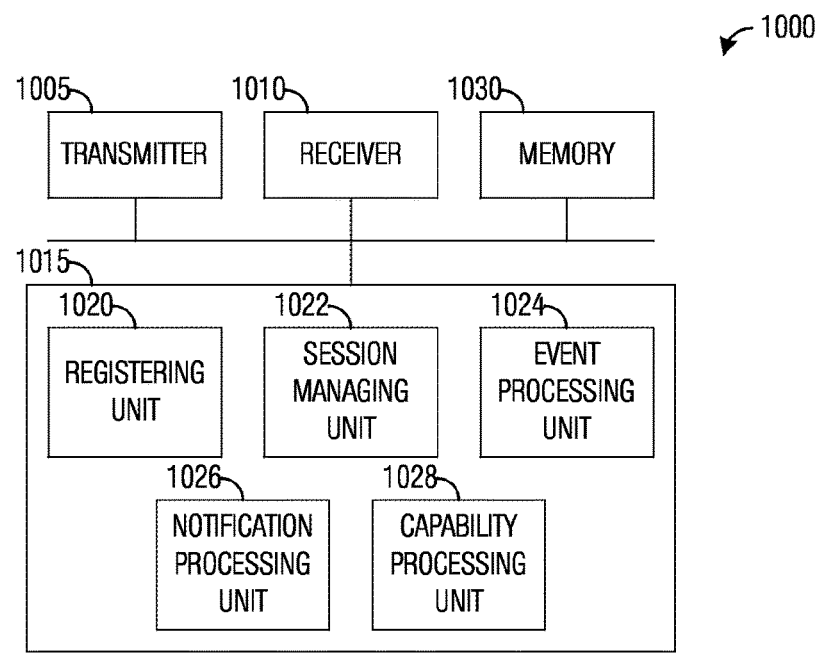
FIG. 10 illustrates an example first communications device according to example embodiments described herein.

FIG. 10 illustrates an example first communications device 1000. Communications device 1000 may be an implementation of a phone. Communications device 1000 may be used to implement various ones of the embodiments discussed herein. As shown in FIG. 10, a transmitter 1005 is configured to transmit packets, notifications, and the like. Communications device 1000 also includes a receiver 1010 that is configured to receive packets, information, and the like.

A registering unit 1020 is configured to generate messages and process messages exchanged during registration. A session managing unit 1022 is configured to generate messages and process messages exchanged during a negotiation of a secure session. Session managing unit 1022 is configured to establish and/or maintain an application layer connection over the secure session. An event processing unit 1024 is configured to process events, such as synchronized information, scheduled or programmed events, incoming events, and the like, at communications device 1000. A notification processing unit 1026 is configured to generate notifications based on events processed by event processing unit 1024. Notification processing unit 1026 is configured to select a wearable device out of a plurality of wearable devices based on event type, wearable device capability, and the like. Notification processing unit 1026 is configured to process notifications received from wearable devices. A capability processing unit 1028 is configured to process wearable device capability shared during a capability exchange and/or inputted by a user to determine capabilities of the wearable devices. Information produced by capability processing unit 1028 is used to select wearable devices. A memory 1030 is configured to store packets, events, capabilities, associations, notifications, information, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while registering unit 1020, session managing unit 1022, event processing unit 1024, notification processing unit 1026, and capability processing unit 1028 may be software modules executing in a microprocessor (such as processor 1015) or a custom circuit or a custom compiled logic array of a field programmable logic array. Registering unit 1020, session managing unit 1022, event processing unit 1024, notification processing unit 1026, and capability processing unit 1028 may be modules stored in memory 1030.

Figure 11:
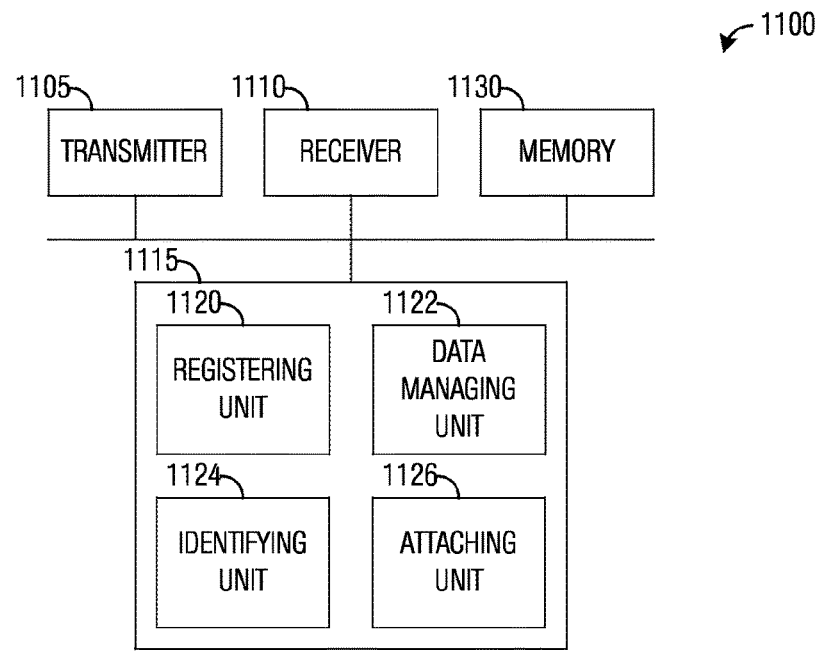
FIG. 11 illustrates an example second communications device according to example embodiments described herein.

FIG. 11 illustrates an example second communications device 1100. Communications device 1100 may be an implementation of a remote server. Communications device 1100 may be used to implement various ones of the embodiments discussed herein. As shown in FIG. 11, a transmitter 1105 is configured to transmit packets, attach messages, unregister messages, register messages, and the like. Communications device 1100 also includes a receiver 1110 that is configured to receive packets, identifying information, and the like.

A registering unit 1120 is configured to generate messages and process messages exchanged during registration. A data managing unit 1122 is configured to manage data, such as identifying information, from phones and/or wearable devices. Data managing unit 1122 is configured to manage a database. An identifying unit 1124 is configured to identify devices registering with communications device 1100. Identifying unit 1124 is configured to determine devices associated with devices registering with communications device 1100. An attaching unit 1126 is configured to generate messages and process messages exchanged during attachment. A memory 1130 is configured to store packets, identifying information, device associations, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while registering unit 1120, data managing unit 1122, identifying unit 1124, and attaching unit 1126 may be software modules executing in a microprocessor (such as processor 1115) or a custom circuit or a custom compiled logic array of a field programmable logic array. Registering unit 1120, data managing unit 1122, identifying unit 1124, and attaching unit 1126 may be modules stored in memory 1130.

Figure 12:
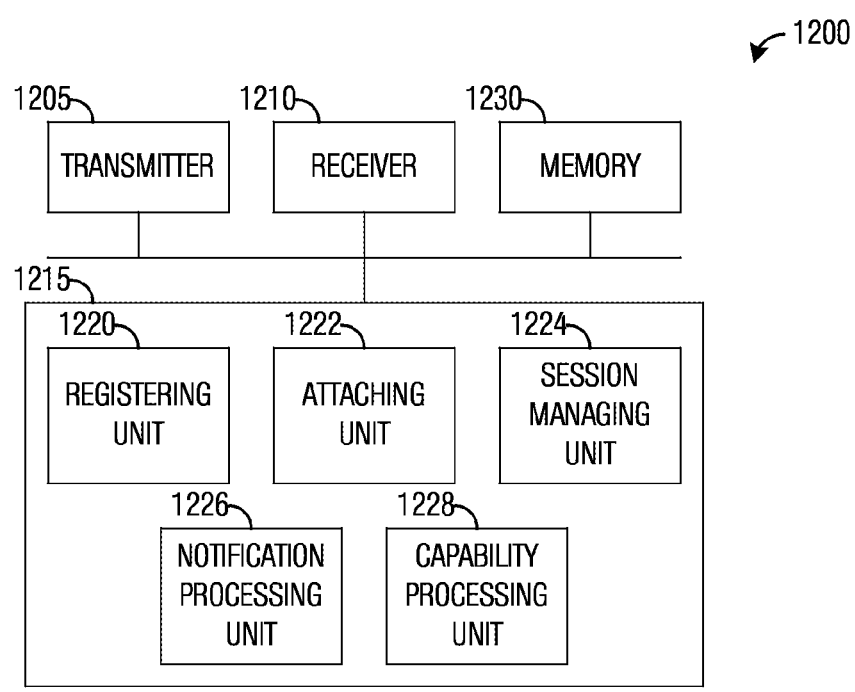
FIG. 12 illustrates an example third communications device according to example embodiments described herein.

FIG. 12 illustrates an example third communications device 1200. Communications device 1200 may be an implementation of a wearable device. Communications device 1200 may be used to implement various ones of the embodiments discussed herein. As shown in FIG. 12, a transmitter 1205 is configured to transmit packets, information, and the like. Communications device 1200 also includes a receiver 1210 that is configured to receive packets, notifications, and the like.

A registering unit 1220 is configured to generate messages and process messages exchanged during registration. An attaching unit 1222 is configured to generate messages and process messages exchanged during attachment. A session managing unit 1224 is configured to generate messages and process messages exchanged during a negotiation of a secure session. Session managing unit 1224 is configured to establish and/or maintain an application layer connection over the secure session. A notification processing unit 1226 is configured to process notifications received by communications device 1200. Notification processing unit 1226 is configured to display notifications. Notification processing unit 1226 is configured to retrieve information related to notifications. Notification processing unit 1226 is configured to generate notifications to be sent to phones. A capability processing unit 1228 is configured share capabilities of communications device 1200 during a capability exchange. A memory 1230 is configured to store packets, capabilities, notifications, information, and the like.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, receiver 1210 and transmitter 1205 may be implemented as a specific hardware block, while registering unit 1220, attaching unit 1222, session managing unit 1224, notification processing unit 1226, and capability processing unit 1228 may be software modules executing in a microprocessor (such as processor 1215) or a custom circuit or a custom compiled logic array of a field programmable logic array. Registering unit 1220, attaching unit 1222, session managing unit 1224, notification processing unit 1226, and capability processing unit 1228 may be modules stored in memory 1230.

Although the present disclosure and its advantages have been described in detail, it should be understood that various changes, substitutions and alterations can be made herein without departing from the spirit and scope of the disclosure as defined by the appended claims.

What is claimed is:

1. A method for exchanging notifications, the method comprising:

registering, by a first user equipment (UE) while the first UE is out of a range for establishing a direct network connection with a wearable device, the first UE with a remote server in a communication network to connect the first UE to the communication network, with identification information of the first UE, identification information of the wearable device, and association information associating the first UE with the wearable device being provided to the remote server by the first UE during registration with the remote server, wherein the first UE has been associated with the wearable device using the association information, and interacts with the wearable device in response to occurrence of an event on the first UE according to association with the wearable device;

receiving, by the first UE after the first UE connects to the communication network, an instruction from the remote server to connect the first UE, via the communication network, with the wearable device that is associated with the first UE according to the association information and that has connected to the communication network;

in response to the instruction, negotiating, by the first UE with the wearable device, a secure session for establishing a communication connection between the first UE and the wearable device via the remote server in the communications network, and establishing, by the first UE, the communication connection with the wearable device;

detecting, by the first UE after the communication connection is established, an occurrence of a first event at the first UE;

sending, by the first UE, a first notification of the first event to the wearable device over the communication connection; and sending, by the first UE, a message to the remote server to unregister the wearable device with the remote server, upon detecting that the communication connection with the wearable device is lost.

2. The method of claim 1, wherein the event comprises at least one of a synchronization of an email from a service, a timer elapsing, an alarm triggering, an incoming message, a social media update, or an incoming call.

3. The method of claim 1, further comprising selecting the wearable device from a plurality of UEs in accordance with an event type associated with the first event and capabilities of UEs in the plurality of UEs.

4. The method of claim 3, further comprising performing a capability exchange with the UEs in the plurality of UEs.

5. The method of claim 3, further comprising receiving input regarding capabilities of the UEs in the plurality of UEs.

6. The method of claim 1, wherein establishing the communication connection comprises:

establishing the communication connection over the secure session.

7. The method of claim 1, further comprising:

establishing a direct short range connection with a second UE, wherein the first UE is associated with the second UE and interacts with the second UE in response to occurrence of events on the first UE.

8. The method of claim 7, further comprising:
determining whether to select the wearable device or the second UE for sending a second notification of a second event that has occurred on the first UE; and
sending the second notification of the second event to the second UE over the direct short range connection in response to the second UE being selected.

9. The method of claim 1, further comprising:
determining that the wearable device is no longer attached; and
tearing down the communication connection.

10. The method of claim 1, wherein the first UE comprises a smart phone.

11. The method of claim 1, further comprising receiving a second notification from the wearable device over the communication connection.

12. A method for exchanging notifications, the method comprising:
registering, by a wearable device while the wearable device is out of a range for establishing a direct network connection with a first UE, the wearable device with a remote server in a communication network to connect the wearable device with the communication network, the wearable device having been associated with the first UE using association information associating the wearable device and the first UE, and configured to interact with the first UE in response to occurrence of an event on the wearable device according to association with the first UE;
receiving, by the wearable device from the remote server after the wearable device is connected to the communication network, an instruction to connect the wearable device, via the communication network, with the first UE that has connected to the communication network;
in response to the instruction, negotiating, by the wearable device with the first UE, a secure session for establishing a communication connection between the wearable device and the first UE via the remote server in the communications network, and establishing, by the wearable device, the communication connection with the first UE via the remote server in the communications network;
sending, by the wearable device to the first UE over the communication connection, capability information of the wearable device, the capability information allowing the first UE to determine whether to interact with the wearable device in response to occurrence of an event on the first UE;
receiving, by the wearable device, a first notification of a first event occurring at the first UE over the communication connection; and
operating, by the wearable device, in a manner responsive to the first notification.

13. The method of claim 12, wherein establishing the communication connection comprises:
establishing the communication connection over the secure session.

14. The method of claim 13, further comprising:
providing identifying information to the remote server.

15. The method of claim 12, wherein the first notification comprises a synchronization of an email from a service, and wherein operating in the manner responsive to the first notification comprises:
displaying at least a portion of the email.

16. The method of claim 12, further comprising performing a capability exchange with the first UE.

17. The method of claim 12, further comprising sending a second notification to the first UE over the communication connection.

18. A first user equipment (UE) comprising:
a processor configured to:
register the first UE with a remote server in a communication network in order to connect the first UE to the communication network while the first UE is out of a range for establishing a direct network connection with a wearable device and is not connected to the wearable device, the first UE having been associated with the wearable device using association information, and configured to interact with the wearable device in response to occurrence of an event on the first UE according to association with the wearable device, and wherein the first UE provides, to the remote server during registration with the remote server, identification information of the first UE, identification information of the wearable device, and the association information associating the first UE with the wearable device,
receive, after the first UE is connected to the communication network, an instruction from the remote server to connect the first UE, via the communication network, with the wearable device that is associated with the first UE according to the association information and that has connected to the communication network,
in response to the instruction, negotiate with the wearable device, a secure session for establishing a communication connection between the first UE and the wearable device via the remote server in the communications network, and establish the communication connection with the wearable device via the remote server in the communications network,
detect an occurrence of a first event on the first UE after the communication connection is established, and
a transmitter operatively coupled to the processor, the transmitter configured to send a notification of the first event to the wearable device over the communication connection, and to send a message to the remote server to unregister the wearable device with the remote server, upon the communication connection with the wearable device being lost.

19. The first UE of claim 18, wherein the processor is configured to select the wearable device from a plurality of UEs in accordance with an event type associated with the first event and capabilities of UEs in the plurality of UEs.

20. The first UE of claim 19, wherein the processor is configured to perform a capability exchange with the UEs in the plurality of UEs.

21. The first UE of claim 18, wherein the processor is configured to establish the communication connection over the secure session.

22. The first UE of claim 18, wherein the processor is configured to receive input comprising capability information of the wearable device.

23. The first UE of claim 18, wherein the processor is configured to determine that the wearable device is no longer attached, and to tear down the communication connection.

24. The first UE of claim 18, wherein the event comprises at least one of a synchronization of an email from a service, a timer elapsing, an alarm triggering, an incoming message, a social media update, or an incoming call.

25. The first UE of claim 18, wherein the first UE is a smart phone.

26. The first UE of claim 18, wherein the processor is further configured to receive a second notification from the wearable device over the communication connection.

\* \* \* \* \*